(12) United States Patent
Cieślak et al.

(10) Patent No.: US 11,167,665 B2
(45) Date of Patent: Nov. 9, 2021

(54) BASE FRAME FOR A VEHICLE SEAT AS WELL AS A VEHICLE SEAT

(71) Applicant: FAURECIA AUTOSITZE GMBH, Stadthagen (DE)

(72) Inventors: Marcin Cieślak, Grójec (PL); Mieszko Pazderski, Warsaw (PL)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 0 days.

(21) Appl. No.: 16/433,379

(22) Filed: Jun. 6, 2019

(65) Prior Publication Data
US 2020/0001749 A1 Jan. 2, 2020

(30) Foreign Application Priority Data
Jun. 27, 2018 (DE) .......... 10 2018 115 49.2

(51) Int. Cl.
*B60N 2/16* (2006.01)
*B60N 2/02* (2006.01)

(52) U.S. Cl.
CPC ......... *B60N 2/1615* (2013.01); *B60N 2/0232* (2013.01); *B60N 2/165* (2013.01); *B60N 2002/0236* (2013.01)

(58) Field of Classification Search
CPC .............................. B60N 2/1615; B60N 2/165
See application file for complete search history.

(56) References Cited

U.S. PATENT DOCUMENTS

| | | | | |
|---|---|---|---|---|
| 6,382,706 B2* | 5/2002 | Yuge | ........................ | B60J 5/106 296/106 |
| 6,513,859 B2* | 2/2003 | Yuge | .................... | E05F 15/619 296/146.4 |
| 7,243,976 B2* | 7/2007 | Okada | ................... | E05F 15/619 296/146.4 |
| 2002/0023988 A1* | 2/2002 | Becker | ................. | B60N 2/1615 248/157 |
| 2009/0152433 A1* | 6/2009 | Choi | .................... | B60N 2/1615 248/421 |
| 2012/0248840 A1* | 10/2012 | Becker | ................. | B60N 2/1675 297/344.1 |
| 2018/0009338 A1* | 1/2018 | Kim | ..................... | B60N 2/1615 |

FOREIGN PATENT DOCUMENTS

| | | |
|---|---|---|
| CN | 103264645 A | 8/2013 |
| DE | 10042851 A1 | 3/2002 |
| DE | 102007027410 A1 | 12/2008 |
| DE | 102011001638 A1 | 10/2012 |
| DE | 102016001564 A1 | 8/2017 |
| EP | 1813465 A2 | 8/2007 |

* cited by examiner

*Primary Examiner* — Timothy J Brindley
(74) *Attorney, Agent, or Firm* — Barnes & Thornburg LLP

(57) ABSTRACT

A base frame for a vehicle seat comprising two lateral parts and swing arms pivoting in relation to the lateral parts. The base frame can be height adjusted by pivoting the swing arms. Pivoting the swing arms can be caused by operating at least one actuator arm. The actuator arm is rotatably mounted on an anchor point on one of the swing arms so that the swing arms, upon operation of the at least one actuator arm, can be pivoted along a direction of adjustment about a pivot point and, thereby, the lateral parts of the base frame are movable in a direction of height adjustment.

13 Claims, 4 Drawing Sheets

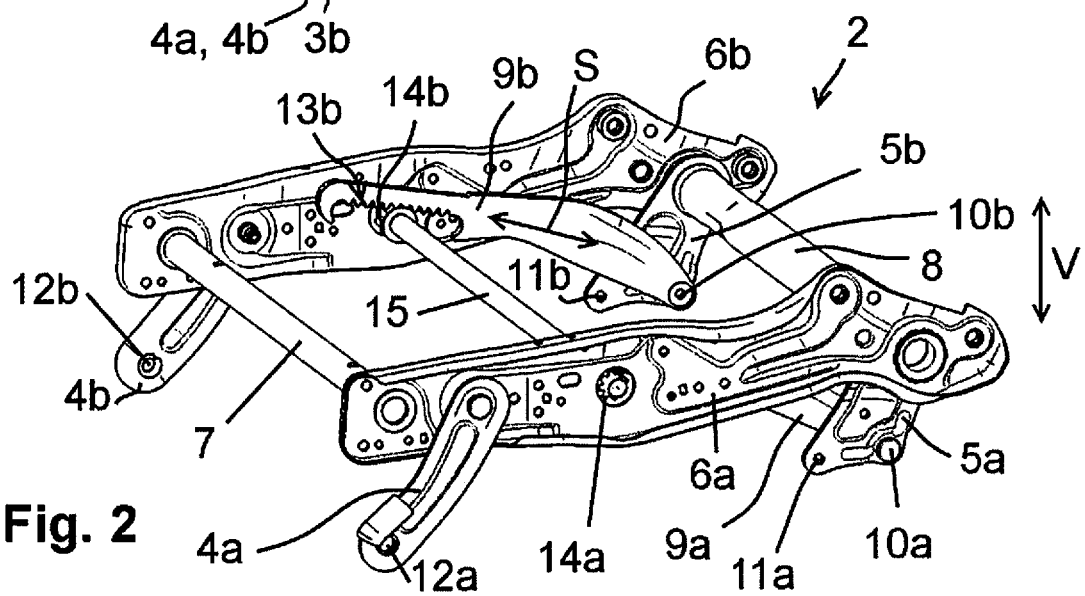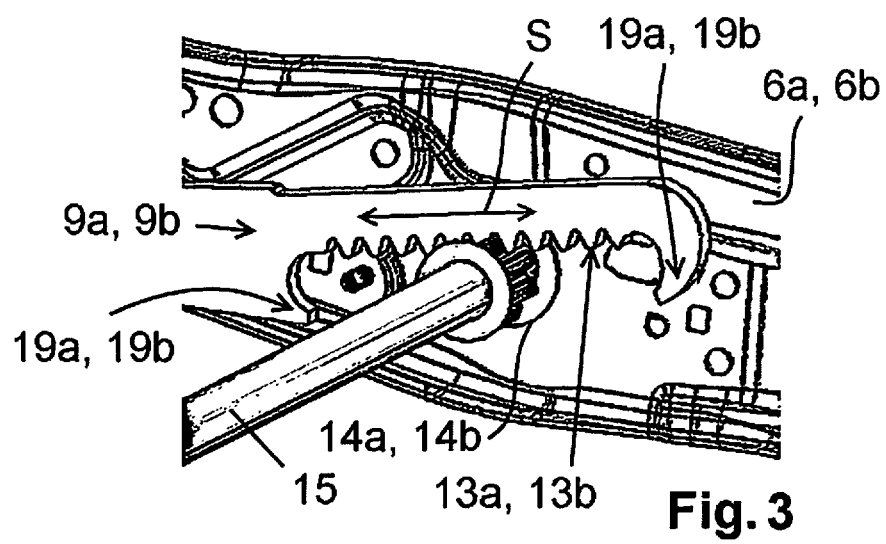

BASE FRAME FOR A VEHICLE SEAT AS WELL AS A VEHICLE SEAT

PRIORITY CLAIM

Figure 4A:
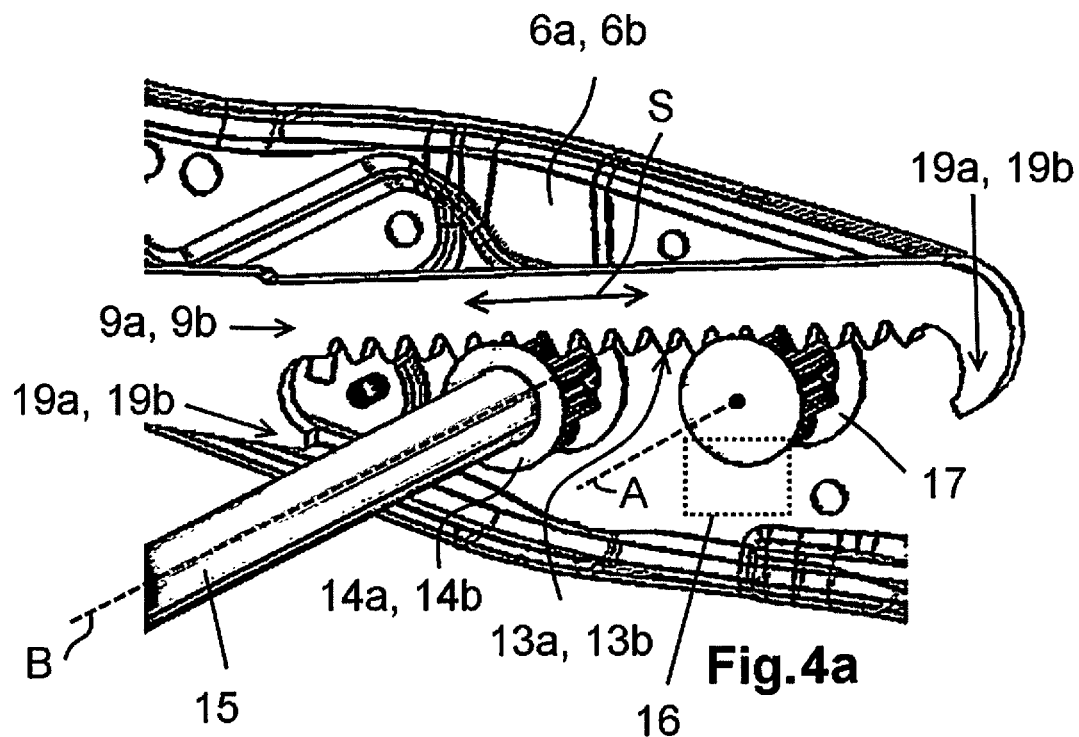

This application claims priority to German Application No. DE10201811549.2, filed Jun. 27, 2018, which is expressly incorporated by reference herein.

BACKGROUND

The present disclosure relates to a base frame for a vehicle seat.

SUMMARY

According to the present disclosure, a base frame as well as a vehicle seat including the base frame allows for a simple and secure height adjustment even under heavy load.

In illustrative embodiments, a base frame for a vehicle seat having two lateral parts and swing arms pivoting in relation to the lateral parts, to provide at least two actuator arms, each actuator arm being associated with another swing arm of the base frame, so by operating the respective actuator arm the associated swing arm can be pivoted. In illustrative embodiments, the operation of the at least two actuator arms along a moving direction is synchronized so that the two associated swing arms pivot in a synchronized manner. Thereby, it is achieved, at least, that the adjustment of the swing arms happens pairwise by means of a synchronized operation of the actuator arms.

In illustrative embodiments, the base frame of the present disclosure makes it unnecessary to transmit the pivoting action of one of the swing arms at one side of the vehicle seat or, respectively, of the base frame to the other side via a connecting pipe. Rather, the swing arms on both sides are pivoted directly when operated via the actuator arms. In order to minimize unbalanced adjustment of both sides of the base frame or, respectively, the lateral parts the actuator arms, the operation of which adjusts the swing arms, are synchronized in their motion.

In illustrative embodiments, this approach provides for the transmission of force into the lateral parts of the base frame upon height adjustment because the force is introduced in two places. This allows the height adjustment to be carried out in a simpler manner or, respectively, with less loss of power leading to increased comfort for the occupant because the height adjustment can be carried out more smoothly. It is then unnecessary to transmit the force via a connecting rod of the base frame or, respectively, this transmission of force can be minimized considerably. This also allows manufacturing cost to be minimized because the rigidity of the connecting rod can be configured differently. Moreover, in the event of a crash, a transmission of forces takes place from the base frame to the actuator arms because, in this case, the force can be diverted on both sides via two actuator arms.

In illustrative embodiments, it is provided that exactly two actuator arms are provided, each actuator arm being associated with one rear swing arm of the base frame. Thus, one actuator arm is associated with each side of the vehicle seat in the rear region, which is also adjusted, and at least one swing arm on each side can be selectively pivoted. It is also possible, in principle, for the front swing arms to be actuated in a synchronized manner via respective actuator arms—alternative to or in addition to—the rear swing arms in order to carry out the height adjustment.

In illustrative embodiments, it is further provided that the swing arms are attached via the pivot points to an upper rail for enabling a longitudinal adjustment, whereby the pivot points at the swing arm and the anchor points at the swing arm are spaced apart. This helps to attain are suitable transition from a longitudinal adjustment of the vehicle seat as well as a simple operation of the swing arms with a low number of parts for the height adjustment.

In illustrative embodiments, it is provided that the synchronization of the operation of the actuator arms is achieved via a rotating synchronization rod, whereby the synchronization rod acts on both actuator arms in such a way that the movement of the two actuator arms is coordinated. Hereby, a synchronization can be attained in a simple manner in that the movement of the two actuator arms is coupled via a transverse synchronization rod.

In illustrative embodiments, it is provided that at the end of the synchronization rod actuator pinions are rigidly fixed and the actuator arms each are provided with a bottom toothing (gearing), whereby each actuator pinion combs at the bottom toothing of another actuator arm so that any rotation of the actuator pinions and, therewith, operation of the actuator arms happens in sync. Thus, a reciprocal mechanical transmission of the movements of the actuator arms via the synchronization rod is achieved in a simple way that can be easily manufactured and assembled with a small number of components. If it is desired to pivot more than two swing arms via more than two actuator arms, correspondingly, further actuator pinions are to be mounted on the synchronization rod.

In illustrative embodiments, it is further provided that the bottom toothing at the actuator arm is terminated with a stop on one side or on both sides. This, limits the movement of the actuator arms so that there is a limit to the extent of the height adjustment. Moreover, for example, in the event of a crash, forces can be absorbed additionally.

In illustrative embodiments, it is provided that at least one of the actuator arms can be operated directly or indirectly via an operating device, whereby, to that end, the operating device indirectly or directly drives the synchronization rod in order to allow synchronized operation of the actuator arms. Thus, synchronization happens as early as in operation and the operation is distributed, via the synchronization rod, directly to both sides so that the force can be redistributed immediately.

In illustrative embodiments, it is provided that the operating device acts on one of the actuator arms, directly, via an additional drive pinion and the operation of the one actuator arm can be transmitted via the actuator pinions and the synchronization rod to the other actuator arm. Thus, the operation can be induced directly into the actuator arm in a simple manner. To that end, it may be provided that the additional drive pinion acts on the bottom toothing of the respective actuator arm or on an upper toothing on the respective actuator arm. This can be attained with only little effort so that a simple operation of the actuator arms can be achieved.

In illustrative embodiments, it is provided that the operating device acts on the actuator pinion via an additional drive pinion, whereby the additional drive pinion combs on the actuator pinion and the operation can be transmitted via the synchronization rod and the actuator pinions to the two actuator arms. This can provide another option to operate, whereby the actuator arms, in this case, are operated indirectly via the actuator pinions. This, too, allows for a synchronous operation of the actuator arms with little effort.

In illustrative embodiments, the operating device can be arranged on the inside of the lateral parts because the actuator arms and the swing arms are preferably also disposed on the inside. This requires no space on the outside for the operating device.

In illustrative embodiments, it is provided that the operating device acts directly on the actuator pinion or the synchronization rod and the operation can be transmitted via the synchronization rod and the actuator pinions to both of the actuator arms. Thus, the synchronization rod may also be operated directly and can be utilized to carry out a synchronous operation of the actuator arms, with no further drive pinion being used for this. Then, for example, the operating device must then be attached to the lateral part on the outside and can, from there, be operationally connected to the synchronization rod or the actuator pinion in a simple manner.

In illustrative embodiments, it is further provided that die operating device is driven manually, for example, via a pump using an operating lever, or electrically, for example, by a motor, whereby the electrical operation can also happen in an automated fashion.

In illustrative embodiments, a vehicle seat is provided comprising a base frame according to the present disclosure so that the entire vehicle seat can be adjusted in the height adjustment direction by synchronous operation of the actuator arms.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 4B:
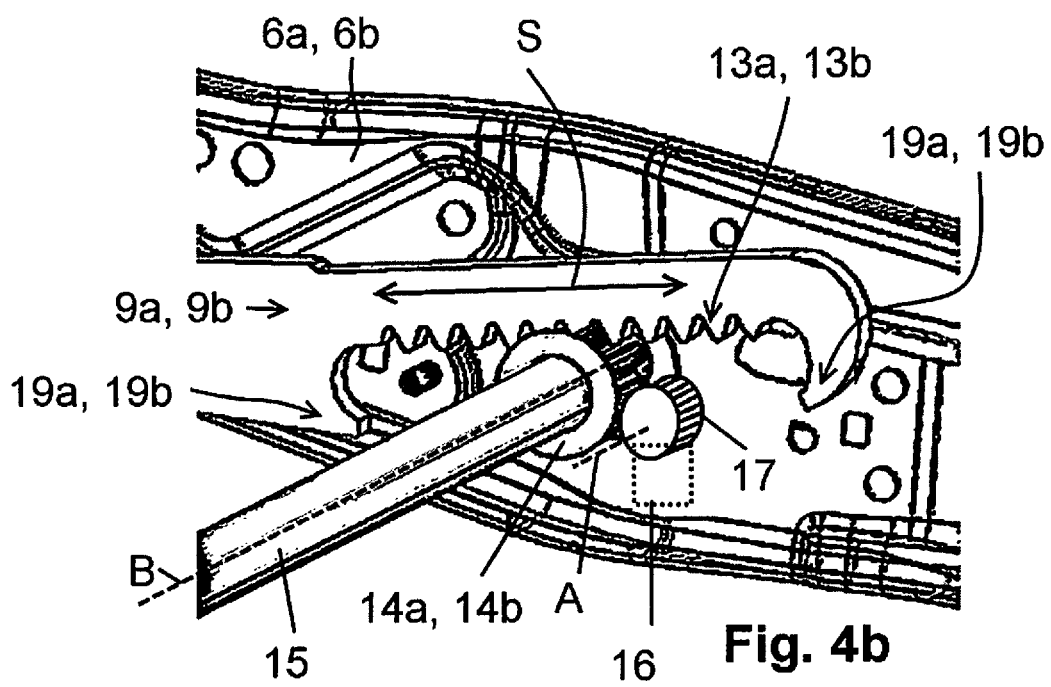
Figure 4C:
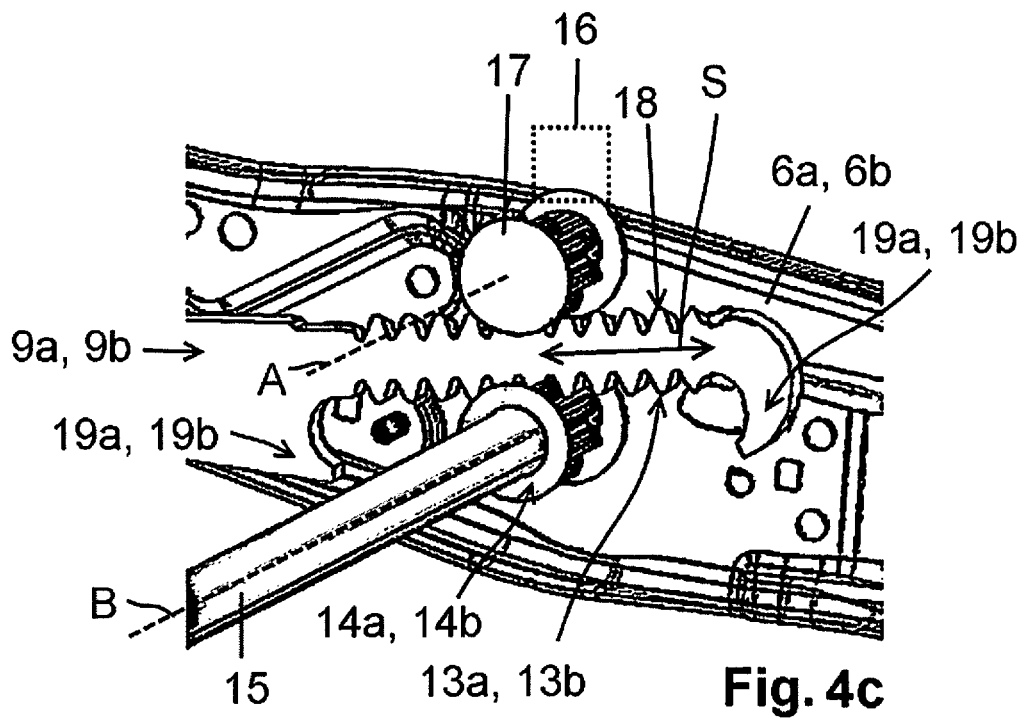
Figure 4D:
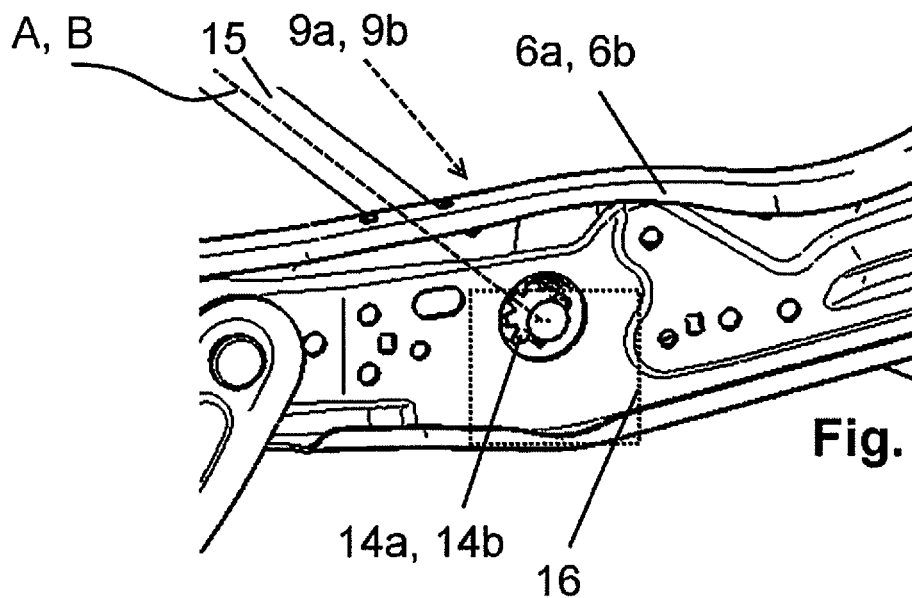
Figure 5:
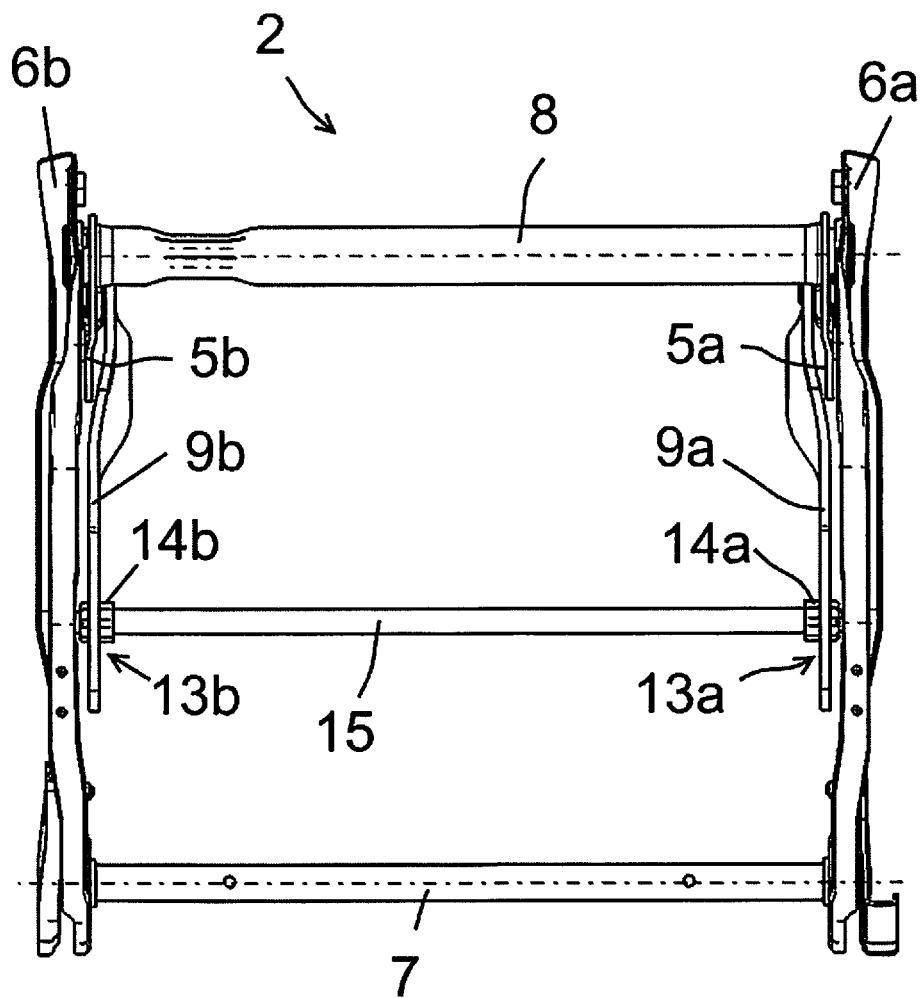

The detailed description particularly refers to the accompanying figures in which:

FIG. 1 is a schematic view of a vehicle seat;

FIG. 2 a perspective view of a of a base frame of the vehicle seat according to FIG. 1;

FIG. 3 a detailed view of the base frame according to FIG. 2;

FIGS. 4a-d show various concepts of operating the height adjustment of the vehicle seat according to FIG. 1; and FIG. 5 is a top view of the base frame according to FIG. 1.

DETAILED DESCRIPTION

According to FIG. 1 a vehicle seat 1 is shown comprising a seat part 1a and a back rest 1b. The vehicle seat 1 is held, via upper rails 3a arranged on the left and the right side, on lower rails 3b firmly affixed to the vehicle bottom in such a way that it can be longitudinally adjusted so as to guarantee a longitudinal adjustment of the vehicle seat 1. Moreover, the vehicle seat 1 is provided with a height adjustment means. For the purpose of adjusting the height of the vehicle seat 1, front swing arms 4a, 4b and rear swing arms 5a, 5b are provided each on the right and left sides which, when operated, cause the base frame 2 being part of the seat part 1a to be height adjusted ion relation to the upper rail 3a or, respectively, the bottom of the vehicle.

According to FIG. 2, to that end, the base frame 2 is equipped on the right and left sides with one lateral part 6a, 6b each, with one end each of the two front swing arms 4a, 4b being pivoting mounted thereon. At their other ends the two front swing arms 4a, 4b are each pivoting mounted on the upper rail 3a. The two rear swing arms 5a, 5b pivoting mounted on the upper rail 3a and also rotatable in relation to the lateral parts 6a, 6b. Thus, pivoting the swing arms 4a, 4b, 5a, 5b causes the base frame 2 or, respectively, the lateral parts 6a, 6b to be raised or lowered in relation to the upper rail 3a in a manner described below:

The lateral parts 6a, 6b are connected to each other via connecting pipes 7, 8 to determine, in particular, the position of the lateral parts 6a, 6b relative to each other. Hereby, a front connecting pipe 7 connects the lateral parts 6a, 6b rigidly to each other. A rear connecting pipe 8 is rigidly connected to the lateral parts 6a, 6b, and the rear swing arms 5a, 5b are pivoting mounted on the right and left sides onto the rear connecting pipe 8 or otherwise rotatable attached thereto so that the rear swing arms 5a, 5b can rotate relative to the rear connecting pipe 8. Alternatively, the rear connecting pipe 8 may be rigidly connected to the rear swing arms 5a, 5b and rotatable attached to the lateral parts 6a, 6b. What is achieved in both cases is that the lateral parts 6a, 6b or, respectively, the entire base frame 2 is adjusted in height when the rear swing arms 5a, 5b are pivoted.

In this arrangement the height adjustment is triggered by the rear swing arms 5a, 5b which, as will be explained below, can be selectively adjusted for adjusting the height. The front swing arms 4a, 4b automatically also pivot via the rotating connection to the lateral parts 6a, 6b and on the upper rail 3a thereby determining the movement the base frame 2 in the frontal region so that a consistent lifting or, respectively, lowering of the vehicle seat 1 can be attained.

The operation or, respectively, the active pivoting of the rear swing arms 5a, 5b is achieved by means of actuator arms 9a, 9b arranged on the right and left sides, with each side of the vehicle seat 1 being associated with its own actuator arm 9a, 9b. This is shown, complementary, in FIG. 5 in a top view. Thus, an adjustment of the rear swing arms 5a, 5b and, therewith, a height adjustment of the vehicle seat 1 is provided not only by one-sided actuation on one of the rear swing arms 5a, 5b. This avoids a unilaterally induced height adjustment of the vehicle seat 1 thereby generally improving the transmission of power and the handling for adjusting the height. Even in the event of a crash a transmission of power happens bilaterally onto the rear swing arms 5a, 5b as well as the actuator arms 9a, 9b so that the forces acting on one actuator arm 9a, 9b are reduced.

In order to pivot the rear swing arms 5a, 5b the actuator arms 9a, 9b are rotatably connected to the rear swing arm 5a, 5b always on one end via an anchor point 10a, 10b so that, upon operation of the actuator arms 9a, 9b along a direction of adjustment S, the respective rear swing arm 5a, 5b pivots around a rear pivot point 11a, 11b situated on the upper rail 3a. By pivoting about the respective rear pivot point 11a, 11b that lateral parts 6a, 6b are moved by the rear swing arms 5a, 5b rotatably attached thereto upwards or, respectively, downwards in a direction of height adjustment V, as it is customary in the height adjustment of a vehicle seat 1. Hereby, the movement of the lateral parts 6a, 6b is determined, on the front side, via the front swing arms 4a, 4b which, in this case, each pivot about their front pivot points 12a, 12b on the upper rail.

In order to adjust the actuator arms 9a, 9b along the direction of adjustment S, the actuator arms 9a, 9b according to this embodiment example each comprise at their end a lower toothing 13a, 13b each of which comb on a an actuator pinion 14a, 14b. The actuator pinions 14a, 14b are each disposed at their ends on a synchronization rod 15 so that the actuator pinions 14a, 14b rotate in sync with each other. Thus, by means of the synchronization rod 15 it is achieved that the actuator arms 9a, 9b, too, move in sync along the direction of adjustment S when the synchronization rod 15 or, respectively, one of the actuator pinions 14a, 14b are operated in any way directly or indirectly. Thereby, the rear swing arms 5a, 5b, too, are adjusted in sync so that differences in height adjustment of the two lateral parts 6a, 6b can be avoided.

The co-action of the adjustment pinion 14a, 14b with the respective lower toothing 13a, 13b of the actuator arms 9a, 9b is shown in greater detail for one side of the base frame 2 in FIG. 3. According to this, the elongated lower toothing 13a, 13b combs on the respective actuator pinion 14a, 14b, thereby adjusting the respective actuator arm 6a, 6b, upon rotation of the actuator pinion 14a, 14b, into the respective direction of adjustment S, so that the lateral parts 6a, 6b or, respectively, the base frame 2 or, respectively, the vehicle seat 1 can be adjusted in height via pivoting the rear swing arms 5a, 5b.

Each actuator arm 9a, 9b further comprises, on both sides of the lower toothing 13a, 13b, a stop 19a, 19b providing that the actuator arm 9a, 9b can be adjusted along the direction of adjustment S only within a given range. Thus, the actuator pinion 14a, 14b combing the lower toothing 13a, 13b can be moved only within a given range along the actuator arm 9a, 9b. This determines to what extent the vehicle seat 1 can be adjusted upwards or, respectively, downwards. Also, this provides, in the event of a crash, a stop beyond which the vehicle seat 1 cannot be moved. This acts both on the right and the left side so that the forces can be absorbed by both rear swing arms 5a, 5b.

By operating the two actuator arms 9a, 9b on the right and left side, which is synchronized, the force can be spread over the rear swing arms 5a, 5b with the transmission of force between the two sides no longer happening via the rear connecting pipe 8 but, rather, is directed directly towards the two rear swing arms 5a, 5b. Thus, the rear connecting pipe 8 can be made entirely having a lower degree of stiffness and therefore at reduced manufacturing cost. Moreover, the adjustment mechanism becomes simpler overall.

As described above, the synchronization of both sides is achieved via the synchronization rod 15 to be operated accordingly for a height adjustment of the seat. For that purpose, various drive concepts are depicted in the FIGS. 4a through 4d, whereby, in each drive concept, only a one-sided operation via a corresponding operating device 16 is provided. The operative motion is transmitted accordingly via the synchronization rod 15 also to the other side of the vehicle seat 1 or, respectively, to the other actuator arm 9a, 9b.

Thus, according to FIG. 4a, it is provided that the lower toothing 13a, 13b of the actuator arm 9, 9b is designed to be extended on one side of the base frame 2 in relation to the detailed image in FIG. 3. In addition to the actuator pinions 14a, 14b a further drive pinion 17 is provided which also combs on the lower toothing 13a, 13b of the respective actuator arm 9a, 9b. The drive pinion 17 acts together with a corresponding operating device 16 driving the drive pinion 17 about a drive axis A. In this embodiment, a synchronization axis B is arranged separate from the A.

In the Figures, the operating device 16 is shown only schematically. It can be provided as a manual or as an electrically operated operating device 16. As a manual operating device 16, for example, a pump can be used which is operated by the occupant via an operating lever, not shown, in a pumping action. This pumping operation rotates the drive pinion 17 about the drive axis A. An electrical operating device 16 may comprise, for example, an electric motor which, when driven accordingly, provides that in whatever way that the drive pinion 17 is rotated about the drive axis A.

Then, the drive pinion 17 provides that the respective actuator arm 9a, 9b is adjusted along the direction of adjustment S. Via the actuator pinions 14a, 14b and the synchronization rod 15 this drive motion is transmitted also to the other actuator arm 9a, 9b at the other side of the base frame 2. Thus, the two rear swing arms 5a, 5b can be pivoted in sync thereby adjusting the height of the vehicle seat 1.

According to the embodiment example in FIG. 4b, in contrast to FIG. 4a, it is provided that the lower toothing 13a, 13b is designed to be shorter again and the drive pinion 17 does not comb on the lower toothing 13a, 13b of the one actuator arm 9a, 9b. Rather, the drive pinion 17 acts together directly with the respective actuator pinion 14a, 14b to drive the same. Thus, the drive pinion 17 is operated via a manual or electrical operating device 16 and these rotational movement is transmitted accordingly to the actuator pinions 14a, 14b directly and, beyond that, to the synchronization rod 15 and the actuator arms 9a, 9b so as to attain the height adjustment of the vehicle seat 1 as described above. In this embodiment example, too, the drive axis A is arranged separate from the synchronization axis B.

According to the embodiment in FIG. 4c, in addition to the lower toothing 13a, 13b, an upper toothing (gearing) 18 is disposed on the respective actuator arm 9a, 9b. In this case, the drive pinion 17 combs on the upper toothing 18 and guaranteeing, via a corresponding operating device 16, that the actuator arm 9a, 9b is adjusted along the direction of adjustment S. Via the synchronization rod 15 the drive motion induced by the drive pinion 17 into the actuator arm 9a, 9b is transmitted, in the same manner as described for the other embodiment example, to the other actuator arm 9a, 9b on the other side of the base frame 2 or, respectively, of the vehicle seat 1 so that, in this embodiment example, too, there is merely a unilateral operation.

In the embodiment example according to FIG. 4d, it is provided that the drive axis A and the synchronization axis B lie on top of each other. Thus, the corresponding operating device 16 directly drives the actuator pinion 14a, 14b or, respectively, the synchronization rod 15 accordingly. To that end, the operating device 16 is attached, for example, from the outside onto the respective actuator pinion 14a, 14b or, respectively, on one side onto the synchronization rod 15, and the synchronization rod 15 or, respectively, the actuator pinions 14a, 14b is driven directly. Then, the operating device 16 is attached accordingly from the outside on the respective lateral part 6a, 6b such that a rotation of the synchronization rod 15 can be produced. Via this, too, the two actuator arms 9a, 9b are adjusted along the direction of adjustment S, and the vehicle seat 1 can be adjusted in height.

LIST OF REFERENCE NUMERALS (PART OF THE DESCRIPTION)

1 vehicle seat
1a seat part
1b back rest
2 base frame
3a upper rail
3b lower rail
4a, 4b front swing arms
5a, 5b rear swing arms
6a, 6b lateral parts of the base frame 2
7 front connecting pipe 8 rear connecting pipe
9a, 9b actuator arm
10a, 10b anchor point
11a, 11b rear pivot point
12a, 12b front pivot point
13a, 13b lower toothing on the actuator arm 9a, 9b
14a, 14b actuator pinions
15 synchronization rod
16 operating device
17 drive pinion
18 upper toothing
19a, 19b stop
A drive axis
B synchronization axis
S direction of adjustment
V direction of height adjustment The present disclosure relates to a base frame (2) for a vehicle seat (1) comprising two lateral parts (6a, 6b) and swing arms (4a, 4b, 5a, 5b) pivoting in relation to the lateral parts (6a, 6b), whereby the base frame (2) can be height adjusted by pivoting the swing arms (4a, 4b, 5a, 5b), whereby pivoting the swing arms (4a, 4b, 5a, 5b) can be caused by operating at least one actuator arm (9a, 9b), whereby the actuator arm (9a, 9b) is rotatably mounted on an anchor point (10a, 10b) on one of the swing arms (4a, 4b, 5a, 5b) so that the swing arms (4a, 4b, 5a, 5b), upon operation of the at least one actuator arm (9a, 9b), can be pivoted along a direction of adjustment (S) about a pivot point (11a, 11b, 12a, 12b) and, thereby, the lateral parts (6a, 6b) of the base frame (2) are movable in a direction of height adjustment (V).

According to the present disclosure, it is provided that at least two actuator arms (9a, 9b) are provided, each actuator arm (9a, 9b) being associated with another swing arm (4a, 4b, 5a, 5b) of the base frame (2) so that, by operating the respective actuator arm (9a, 9b), the associated swing arm (4a, 4b, 5a, 5b) can be pivoted, whereby the operation of the at least two actuator arms (9a, 9b) along the direction of adjustment (S) is synchronized so that the two associated swing arms (4a, 4b, 5a, 5b) pivot in sync.

Besides having a longitudinal adjustment means, vehicle seats can be provided with a height adjustment means. To that end, the vehicle seat comprises, as part of a base frame, various pivoting swing arms, via which the base frame can be selectively adjusted upwards and downwards, for example, in relation to a longitudinally adjustable upper rail. To that end, the pivoting swing arms are mounted, always on both sides, on the upper rail and on lateral parts of the base frame. Usually, for the purpose of height adjustment, one of the two rear swing arms arranged on the left and the right sides is pivoted via an actuator arm, whereby the actuator arm can be adjusted by means of an operating device, for example, a pump. The so pivoted swing arm first acts to unilaterally lift the base frame in the back area of the vehicle seat.

In order to transmit this adjustment motion also to the other swing arms the pivoted rear swing arm is rigidly coupled with the rear swing arm on the other side via a back connecting pipe of the base frame. Thus, the pivoting movement is transmitted via the rear connecting pipe to the other rear swing arm or, respectively, to the other side of the vehicle seat or, respectively, of the base frame. The front swing arms limit the motion of the base frame in the front region which is also lifted by the lateral parts of the base frame so that lifting or lowering of the vehicle seat can be carried out evenly.

Hereby, it is a disadvantage that the rear connecting pipe transmits the entire force from the one rear swing arm to the other side of the base frame. This makes height adjustment more difficult because the forces have to be introduced into the entire base frame via the one rear swing arm. Also, the rear das connecting pipe must be manufactured such that it has a suitable rigidity in order to avoid torsion when high forces are applied. Even in the event of a crash the entire force will be transmitted via the read connecting pipe to the one rear swing arm or, respectively, the actuator arm being in operative connection therewith.

The invention claimed is:

1. A base frame for a vehicle seat, the base frame comprising
two lateral parts and swing arms pivoting in relation to the lateral parts, whereby said base frame can be height adjusted by pivoting said swing arms, whereby the pivoting of said swing arms can be caused by operating at least one actuator arm, said actuator arm being rotatably affixed to an anchor point on one of said swing arms so that said swing arms, upon operation of said at least one actuator arm, can be pivoted along a direction of adjustment (S) about a pivot point and, thereby, said lateral parts of the base frame are movable in a direction of height adjustment (V),
wherein at least two actuator arms are provided, with each actuator arm being associated with another swing arm of the base frame so that, by operating the respective actuator arm, the associated swing arm can be pivoted, whereby the operation of said at least two actuator arms along the direction of adjustment (S) is synchronized so that the two associated swing arms pivot in sync,
wherein an aid operating device acts on one of said actuator arms via an additional drive pinion, wherein said additional drive pinion is driven about a drive axis A, and the operation of said one actuator arm can be transmitted via actuator pinions and a synchronization rod to the other actuator arm, wherein said synchronization rod is rotating about a synchronization axis B which is arranged separate from said drive axis A of said additional drive pinion, and
wherein at the end of said synchronization rod actuator pinions are fixed rigidly and the actuator arms each are provided with a bottom toothing, whereby each actuator pinion combs at the bottom toothing of another actuator arm so that any rotation of the actuator pinions and, therewith, operation of the actuator arms happens in sync.

2. The base frame of claim 1, wherein exactly two actuator arms are provided, each actuator arm being associated with one rear swing arm of the base frame.

3. The base frame of claim 2, wherein said swing arms are attached to an upper rail via the pivot points.

4. The base frame of claim 3, wherein said pivot points on said swing arm and said anchor points on said swing arm are spaced apart.

5. The base frame of claim 4, wherein synchronization of the operation of the actuator arms is achieved via said rotating synchronization rod, whereby said synchronization rod acts on both actuator arms in such a manner that the movement of the two actuator arms is coordinated.

6. The base frame of claim 1, wherein at least one of said actuator arms can be operated directly or indirectly via said operating device, said operating device indirectly or directly driving said synchronization rod for synchronized operation of said actuator arms.

7. The base frame of claim 6, wherein said operating device acts on one of said actuator arms via said additional drive pinion and the operation of said one actuator arm can be transmitted via said actuator pinions and said synchronization rod to the other actuator arm.

8. The base frame of claim 7, wherein said additional drive pinion acts on the bottom toothing of the actuator arm or on an upper toothing on the actuator arm for operating the respective des actuator arm along the direction of adjustment (S).

9. The base frame of claim 6, wherein said operating device acts on said actuator pinion via an additional drive pinion, whereby said drive pinion combs on the actuator pinion and the operation can be transmitted via said synchronization rod and said actuator pinions to said two actuator arms.

10. The base frame of claim 6, wherein said operating device acts directly on said actuator pinion or said synchronization rod and the operation can be transmitted via said synchronization rod and said actuator pinions to said two actuator arms.

11. The base frame of claim 6, wherein said operating device is driven manually via a pump, or electrically by a motor.

12. A vehicle seat comprising
a base frame including two lateral parts and swing arms pivoting in relation to the lateral parts, whereby said base frame can be height adjusted by pivoting said swing arms, whereby the pivoting of said swing arms can be caused by operating at least one actuator arm, said actuator arm being rotatably affixed to an anchor point on one of said swing arms so that said swing arms, upon operation of said at least one actuator arm, can be pivoted along a direction of adjustment (S) about a pivot point and, thereby, said lateral parts of the base frame are movable in a direction of height adjustment (V), wherein at least two actuator arms are provided, with each actuator arm being associated with another swing arm of the base frame so that, by operating the respective actuator arm, the associated swing arm can be pivoted, whereby the operation of said at least two actuator arms along the direction of adjustment (S) is synchronized so that the two associated swing arms pivot in sync, the base frame configured to adjust said vehicle seat in the height adjustment direction (V) by synchronous operation of said actuator arms, wherein an operating device acts on one of said actuator arms via an additional drive pinion, wherein said additional drive pinion is driven about a drive axis A, and the operation of said one actuator arm can be transmitted via actuator pinions and a synchronization rod to the other actuator arm, wherein said synchronization rod is rotating about a synchronization axis B which is arranged separate from said drive axis A of said additional drive pinion, and wherein at the end of said synchronization rod actuator pinions are fixed rigidly and the actuator arms each are provided with a bottom toothing, whereby each actuator pinion combs at the bottom toothing of another actuator arm so that any rotation of the actuator pinions and, therewith, operation of the actuator arms happens in sync.

13. The base frame of claim 5, wherein said bottom toothing at the actuator arm is terminated with a stop on one side or on both sides for limiting the movement of the actuator arm.

* * * * *